US009877152B2

(12) United States Patent
Drew et al.

(10) Patent No.: US 9,877,152 B2
(45) Date of Patent: Jan. 23, 2018

(54) AUTO-LOCATE OPERATION

(71) Applicant: METROTECH CORPORATION, Santa Clara, CA (US)

(72) Inventors: Mark Drew, Naples, FL (US); Razvan Gabriel Stefanoiu, Campina (RO); George Mainescu, Hillsdale, NJ (US)

(73) Assignee: METROTECH CORPORATION, Santa Clara, CA (US)

( * ) Notice: Subject to any disclaimer, the term of this patent is extended or adjusted under 35 U.S.C. 154(b) by 0 days.

(21) Appl. No.: 15/451,179

(22) Filed: Mar. 6, 2017

(65) Prior Publication Data

US 2017/0265029 A1 Sep. 14, 2017

Related U.S. Application Data

(60) Provisional application No. 62/305,433, filed on Mar. 8, 2016.

(51) Int. Cl.
| H04W 4/00 | (2009.01) |
| H04W 4/02 | (2009.01) |
| G01S 5/02 | (2010.01) |
| H04L 29/08 | (2006.01) |
| H04B 3/04 | (2006.01) |
| G01S 19/13 | (2010.01) |

(52) U.S. Cl.
CPC ............ H04W 4/02 (2013.01); G01S 5/0226 (2013.01); H04B 3/04 (2013.01); H04L 67/18 (2013.01); H04W 4/023 (2013.01); G01S 19/13 (2013.01)

(58) Field of Classification Search
CPC ........ H04W 4/02; H04W 4/023; H04L 67/18; G01S 5/0226; G01S 19/13
See application file for complete search history.

(56) References Cited

U.S. PATENT DOCUMENTS

| 6,240,373 | B1 * | 5/2001 | Boggs | G06F 8/65 340/8.1 |
| 6,356,082 | B1 * | 3/2002 | Alkire | G01V 3/06 324/326 |
| 7,443,154 | B1 * | 10/2008 | Merewether | G01V 3/104 324/326 |
| 7,994,770 | B2 * | 8/2011 | Royle | G01V 3/081 324/329 |
| 8,264,226 | B1 * | 9/2012 | Olsson | G01V 3/15 324/326 |
| 8,400,155 | B2 * | 3/2013 | Nielsen | G01V 3/08 324/329 |
| 8,547,247 | B1 * | 10/2013 | Haddy | G01V 1/16 340/870.21 |

(Continued)

OTHER PUBLICATIONS

International Search Report—PCT/US2017/021180—ISA/US—dated May 30, 2017.
Written Opinion—PCT/US2017/021180—ISA/US—dated May 30, 2017.

*Primary Examiner* — William Nealon
(74) *Attorney, Agent, or Firm* — Haynes and Boone, LLP

(57) ABSTRACT

In accordance with some embodiments, a system includes a line locator and a device configured to communicate through an internet with a server also coupled to the internet. Furthermore, a plurality of line locate transmitters are distributed geographically and configured to communicate through the internet with the server. The server operates to activate one of the plurality of line locate transmitters based on a geographic location of the device.

11 Claims, 4 Drawing Sheets

(56) References Cited

U.S. PATENT DOCUMENTS

| | | | | |
|---|---|---|---|---|
| 9,046,621 B2* | 6/2015 | Nielsen | ............... | G01V 3/08 |
| 9,703,002 B1* | 7/2017 | Olsson | ............... | G01V 3/08 |
| 2006/0026020 A1* | 2/2006 | Waite | ............... | G07B 15/00 |
| | | | | 702/2 |
| 2008/0125942 A1* | 5/2008 | Tucker | ............ | A01B 69/008 |
| | | | | 701/50 |
| 2009/0327024 A1* | 12/2009 | Nielsen | ........... | G06Q 10/06398 |
| | | | | 705/7.42 |
| 2010/0188245 A1* | 7/2010 | Nielsen | ............... | G01V 3/08 |
| | | | | 340/686.1 |
| 2010/0189312 A1* | 7/2010 | Nielsen | ............ | G01C 15/02 |
| | | | | 382/113 |
| 2010/0257029 A1* | 10/2010 | Nielsen | ............... | G01V 3/08 |
| | | | | 340/686.1 |
| 2011/0020776 A1* | 1/2011 | Nielsen | ............ | G09B 23/40 |
| | | | | 434/219 |
| 2012/0066506 A1* | 3/2012 | Nielsen | ............... | G08B 5/22 |
| | | | | 713/185 |
| 2012/0150901 A1 | 6/2012 | Johnson et al. | | |

\* cited by examiner

AUTO-LOCATE OPERATION

RELATED APPLICATIONS

The present disclosure claims priority to U.S. Provisional Patent Application No. 62/305,433, entitled "Auto-Locate Operation" and filed on Mar. 8, 2016, which is herein incorporated by reference in its entirety.

BACKGROUND

1. Technical Field

The present disclosure relates to detection of underground lines and, in particular, to auto-location of transmitter services for the location of underground lines.

2. Discussion of Related Art

Underground pipe and cable locators (often termed line locators) have existed for many years and are described in many issued patents and other publications. Line locator systems typically include a mobile receiver and a transmitter. The transmitter is coupled to a target conductor, either by direct electrical connection or through induction, to provide a current signal on the target conductor. The receiver detects and processes signals resulting from the electromagnetic field generated by the target conductor as a result of the current signal, which can be a continuous wave sinusoidal signal provided to the target conductor by the transmitter.

The transmitter is often physically separate from the receiver, with a typical separation distance of several meters or in some cases up to many kilometers. The transmitter couples the current signal, whose frequency can be user chosen from a selectable set of frequencies, to the target conductor. The frequency of the current signal applied to the target conductor can be referred to as the active locate frequency. The target conductor then generates an electromagnetic field at the active locate frequency in response to the current signal.

There is a need for controlling transmitters that are coupled to individual lines in order to locate those lines.

SUMMARY

In accordance with some embodiments, a system includes a line locator; a device configured to communicate through an internet; a server coupled to the internet; and a plurality of line locate transmitters distributed geographically and configured to communicate through the internet, wherein the server operates to activate one of the plurality of line locate transmitters based on a geographic location of the device.

In some embodiments, a device used by a user can be coupled to a server through an internet and execute instructions of receiving a request to activate a transmitter; determining a mode of operation; in auto mode, performing the following steps: determining a geographic location of the device, transmitting the request and the geographic location to the server, receiving transmitter data from the server, determining activation of a chosen transmitter; and in manual mode, activating the chosen transmitter; acquiring locate data from a line locator; and transmitting the locate data to the server.

A server coupled through an internet to a plurality of line locate transmitters, the server executing instructions of receiving a request to activate a transmitter of the plurality of line locate transmitters, the request including a geographic location; determining a chosen transmitter from the plurality of line locate transmitters; activating the chosen transmitter; and providing confirmation that the chosen device is activated.

These and other embodiments will be described in further detail below with respect to the following figures.

The drawings may be better understood by reading the following detailed description.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Additionally, the drawings are not to scale. Relative sizes of components are for illustrative purposes only and do not reflect the actual sizes that may occur in any actual embodiment of the invention. Like numbers in two or more figures represent the same or similar elements. Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Further, embodiments of the invention are illustrated with reference to electrical schematics. One skilled in the art will recognize that these electrical schematics represent implementation by physical electrical circuits, implementation by processors executing algorithms stored in memory, or implementation by a combination of electrical circuits and processors executing algorithms.

In some situations, transmitters are included in various locations. Such transmitters are coupled to various underground lines. In the line location process, such transmitters can be activated to provide signal to the target line. Embodiments of the present invention allow a user 120 to automatically activate the proper utility locating transmitter based on the location of user 120. Embodiments can compare the geographic location of user 120 with a database to determine which of a plurality of transmitters should be activated in order to trace and locate a particularly underground utility line.

Figure 1:
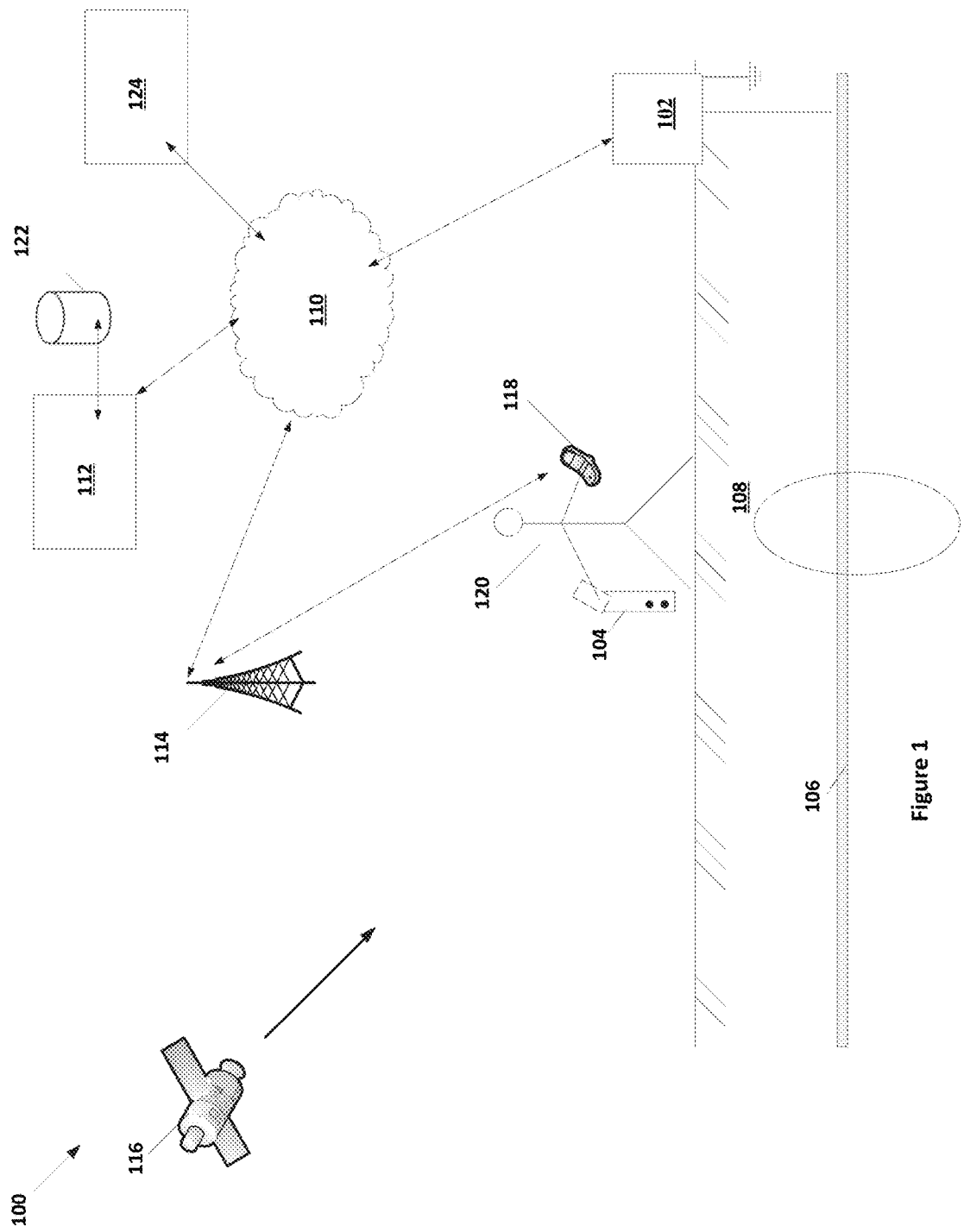
FIG. 1 illustrates operation of a line locator system according to some embodiments of the present invention.

FIG. 1 illustrates a system according to some embodiments of the present invention. As shown in FIG. 1, a user 120 in an operation to locate an underground line 106 with a line locator device 104 can locate and activate a transmitter 102 to provide a signal onto line 106. User 120, through a mobile device 118, can communicate through a network, for example the internet 110, with a central server 112 that could be located in the cloud. Device 118 can also determine its geographic position, for example using GPS satellite array 116. Server 112, using the geographic position of user 120 that is transmitted to it via internet 110, can identify the most appropriate transmitter 102 that is coupled to underground line 106. Transmitter 102 can then be activated through internet 110 to provide a signal on underground line 106. As illustrated in FIG. 1, the signal from transmitter 102 on target line 106 generates a magnetic field 108 that is detected by line locator 104.

In some embodiments, activating transmitter 102 may include providing parameter and instructions to control transmitter 102. For example, while activating transmitter 102, certain parameters such as power and frequency can be also transmitted to transmitter 102 through internet 110.

In some embodiments, device 118 can access services block 124 through internet 110. Services block 124 can be part of server 112, or may be a separate entity in the cloud. Services block 124 may provide services to user 120 such as, for example, a "Ticketing System," a "One Call system," tracking of device 118 and user 120, or other functionality to administer locate functions.

Although FIG. 1 illustrates system 100 that communicates through the internet 110, any network can be used. For example, device 118 can communicate with services block 124, server 112, or transmitter 102 directly through a cell phone network, a local area network, or by any other fashion.

Figure 2:
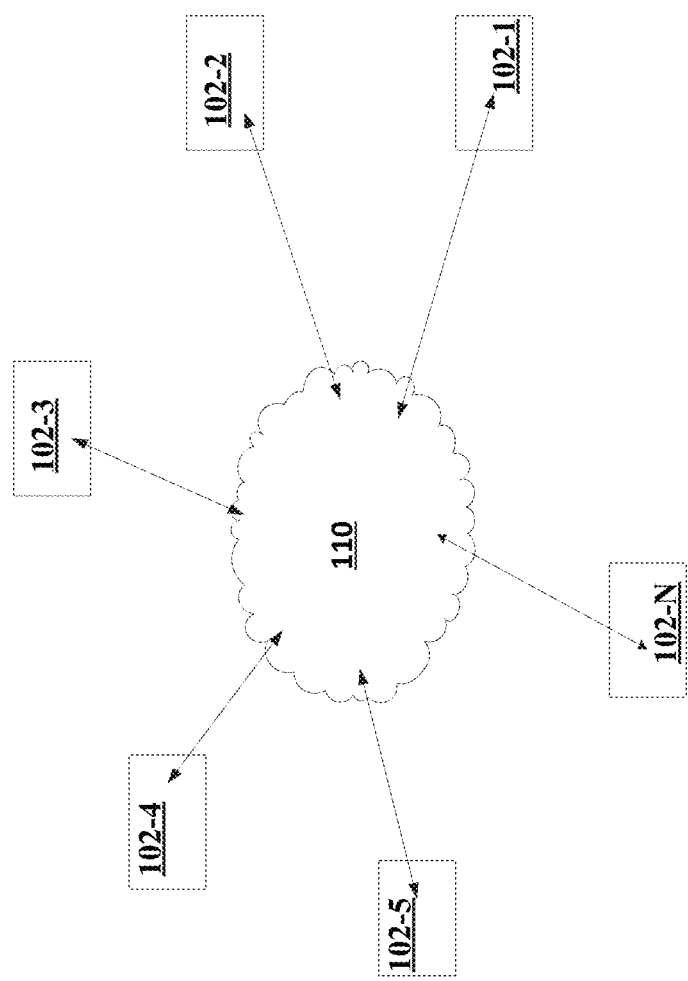
FIG. 2 illustrates a distribution of transmitters according to some embodiments.

FIG. 2 illustrates multiple transmitters 102 (102-1 through 102-N are illustrated) coupled and controlled via the internet 110, for example from server 112. Each of transmitters 102-1 through 102-N (transmitter 102 refers to one of transmitters 102-1 through 102-N) is located at a particular geographic location and is coupled to provide signals on particular underground lines to which they are attached. Each of transmitters 102-1 through 102-N may have individual characteristics regarding transmitted frequencies, powers, or other characteristics. Such characteristics of each of transmitters 102-1 through 102-N can be identified in server 112. User 120, located at a particular geographic location, requests control of one of transmitters 102-1 through 102-N located at particular geographic location of device 118 and coupled to a target underground line 106 of interest and with particular transmission characteristics.

Returning to FIG. 1, server 112 is coupled to database 122. Database 122 includes a database that includes information regarding each of transmitters 102-1 through 102-N. For example, database 122 includes the geographic location of each of transmitters 102-1 through 102-N, which of target lines 106 each of transmitters 102-1 through 102-N are coupled, and the specifics of each signal that transmitters 102-1 through 102-N are capable of coupling to each of underground lines 106, together with other relevant information for users 120. In some embodiments, database 122 can also be used to store locate data from each locator device 104 along with their geographic location. Locate data can, in some cases, be displayed on mobile device 118.

When user 120 has to locate a particular utility line 106 at a particular geographic location, an application installed on device 118 (e.g., phone, tablet, laptop computer, etc) can be activated. In some embodiments, device 118 can include global positioning system (GPS) locating capability and cellular or wi-fi connectivity to allow user 120 to connect to internet 110 or other network in order to send a request to the central server 112. This mode of operation is called "AUTO" mode. In the request, the application operating on device 118 sends to server 112 via internet 110 the GPS coordinates received from the GPS satellite 116 of the position of user 120 for this locate session, together with a request to activate the transmitter that is serving the target line 106 in the proximity of user 120's location.

Server 112 includes a database 122 with the geographic coordinates of all the transmitters 102 (102-1 through 102-N in FIG. 2) in the system, including their GPS locations, routes that they are serving, and other data related to each of transmitters 102. Server 112 can compare the GPS coordinates of the request with the closest routes and transmitter's GPS coordinates to determine one or more transmitters 102 that will allow user 120 to locate underground line 106 with line locator 104. If server 112 can determine the best one of transmitters 102 for the task, server 112 will activate that transmitter 102 to provide the locating tone to line 106 for the closest route to the position of user 120.

In some embodiments, server 112 may not make a definite judgment regarding which of transmitter 102 to activate related to the GPS position of user 120. This may occur for multiple reasons, including having multiple transmitters within appropriate proximity of user 120 or having multiple transmitters with differing characteristics that may affect the locate of underground line 106. In such cases, server 112 may provide user 120 through device 118 a list of possible transmitters 102 that could be activated from which user 120 can choose one of transmitters 102 on the list for activation.

In some embodiments, device 118 may also operate in a "MANUAL" mode. In Manual mode, user 120 can connect directly to and activate a particular transmitter 102 that is to be used. In such cases, the connection between device 118 and the particular one of transmitters 102 may occur directly through internet 110 without going through server 112. In some cases, device 118 may instruct server 112 as to which of transmitters 102 to activate.

Figure 3:
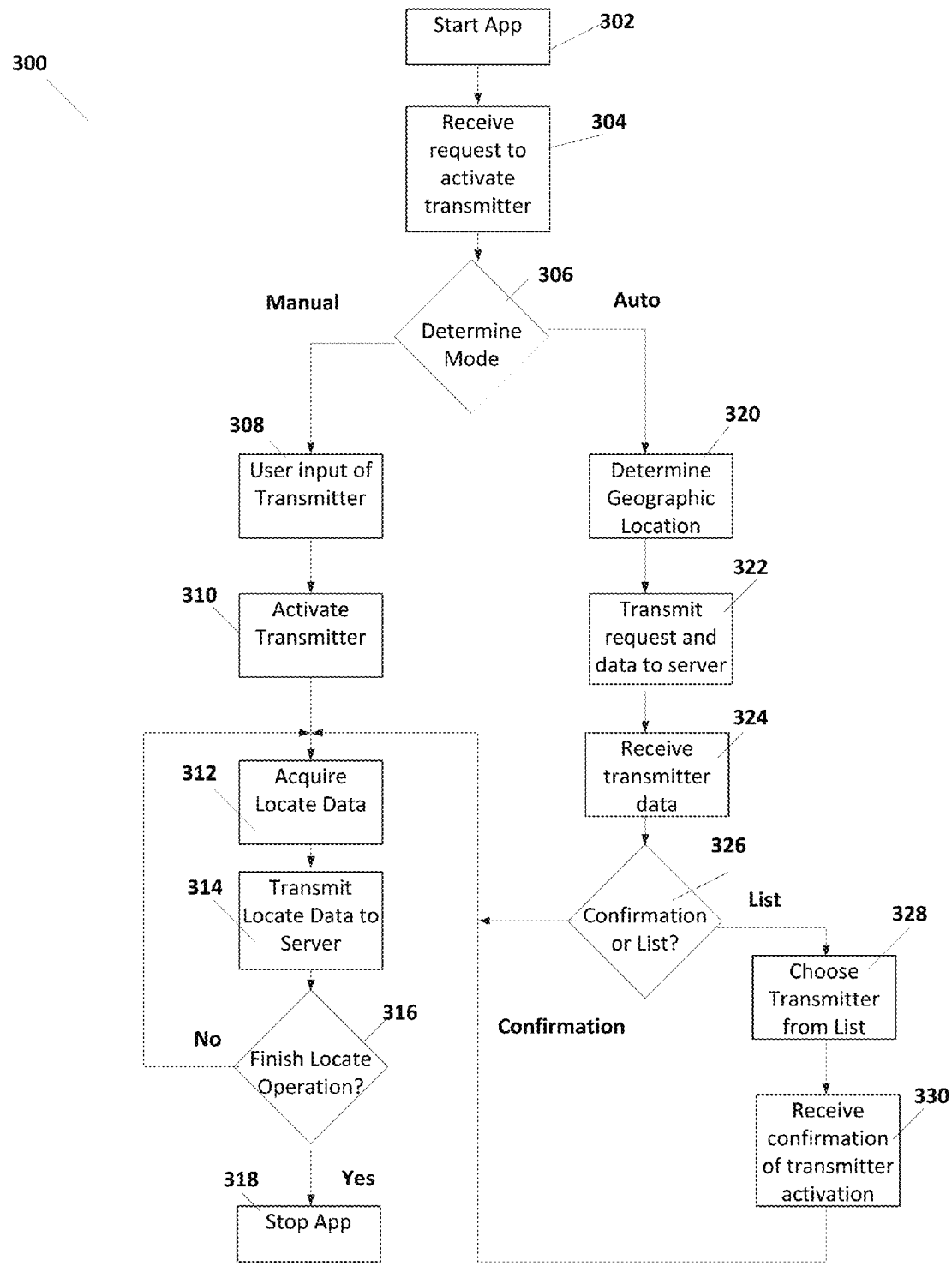
FIG. 3 illustrates operation of an application according to some embodiments operating on a mobile device.

FIG. 3 illustrates operation of an application (APP) 300 on mobile device 118 according to some embodiments. Mobile device 118 can be any mobile device, for example a cellular phone, smart phone, tablet, laptop computer or other device capable of determining its geographic location and communicating with internet 110, either through a separate WiFi link or through a cell tower 114 as illustrated in FIG. 1. Although mobile device 118 is illustrated in FIG. 1 as being a separate device from line locator 104, in some embodiments mobile device 118 may be incorporated within line locator 104. Mobile device 118 includes a user interface (for example a display screen, keyboard, and/or touch-screen) that provides data to user 120 and receives input from user 120. In some embodiments, mobile device 118 can receive locate data from line locator 104.

As illustrated in FIG. 3, APP 300 begins when user 120 initiates APP 300 in start app 302. In step 304, user 120 requests that a transmitter 102 be activated to provide a signal on line 106 so that line 106 can be located. User 120 requests activation when user 120 is in position to start a locate session to track underground line 106.

In step 306, APP 300 determines a mode of operation: Auto or Manual. In Auto mode, a transmitter 102 or choice of transmitters 102 is automatically chosen. In Manual operation, user 120 knows of a particular one of transmitter 102 to activate. In step 306, if APP 300 is in manual mode APP 300 proceeds to step 308. In step 308, user 120 identifies a particular transmitter to activate. In step 310, APP 300 causes device 118 to communicate through internet 110 with transmitter 102 to activate transmitter 102. In some embodiments, device 118 communicates through internet 110 with server 112, which in turn activates the selected transmitter 102 through internet 110. Once activated, transmitter 102 provides a signal onto line 106, which generates magnetic field 108 from line 106, that can be detected by line locator 104.

If APP 300 is in Auto mode, then APP 300 process from step 306 to step 320. In step 320, device 118 determines its geographic location, for example with the use of GPS locating satellites 116. In some cases, the GPS data may come from a separate GPS device with user 120, may come from locator 104, or may come from device 118. In step 322, device 118 transmits a request to activate a transmitter along with the geographic location through internet 110 to server 112. Based on the geographic location received, server 112 determines one or more possible transmitters 102 to activate. In step 324, APP 300 receives either a confirmation that server 112 has activated one of transmitters 102 or, if it is not clear which of transmitters 102 to activate, a list of possible transmitters to activate. In some embodiments, the list of possible transmitters may include characteristics of each of the possible transmitters. In step 326, APP 300 determines whether a confirmation has been received or a list of transmitters has been received. If a list has been received, APP 300 proceeds to step 328 where user 120 chooses one of transmitters 102 from the list of transmitters received and communicates the choice through internet 110 with server 112. In step 330, APP 300 then waits for receipt of a confirmation from server 112 that the chosen one of transmitters 102 has been activated.

From step 330, or from step 326 upon receipt of a confirmation, or from step 310, APP 300 proceeds to step 312. In step 312, user 120 activate line locator 104 to locate the position of line 106 based on detection of magnetic field 108. In step 314, device 118 receives the locate data from line locator 104, along with a geographic location that can come from a separate GPS device connected to the mobile device 118 or locator 104, and transmits the locate data through internet 110 to server 112. In step 316, the user indicates whether or not further locate data should be acquired in this locate session. If so, APP 300 returns to step 312. If not, then APP 300 stops in step 318.

Figure 4:
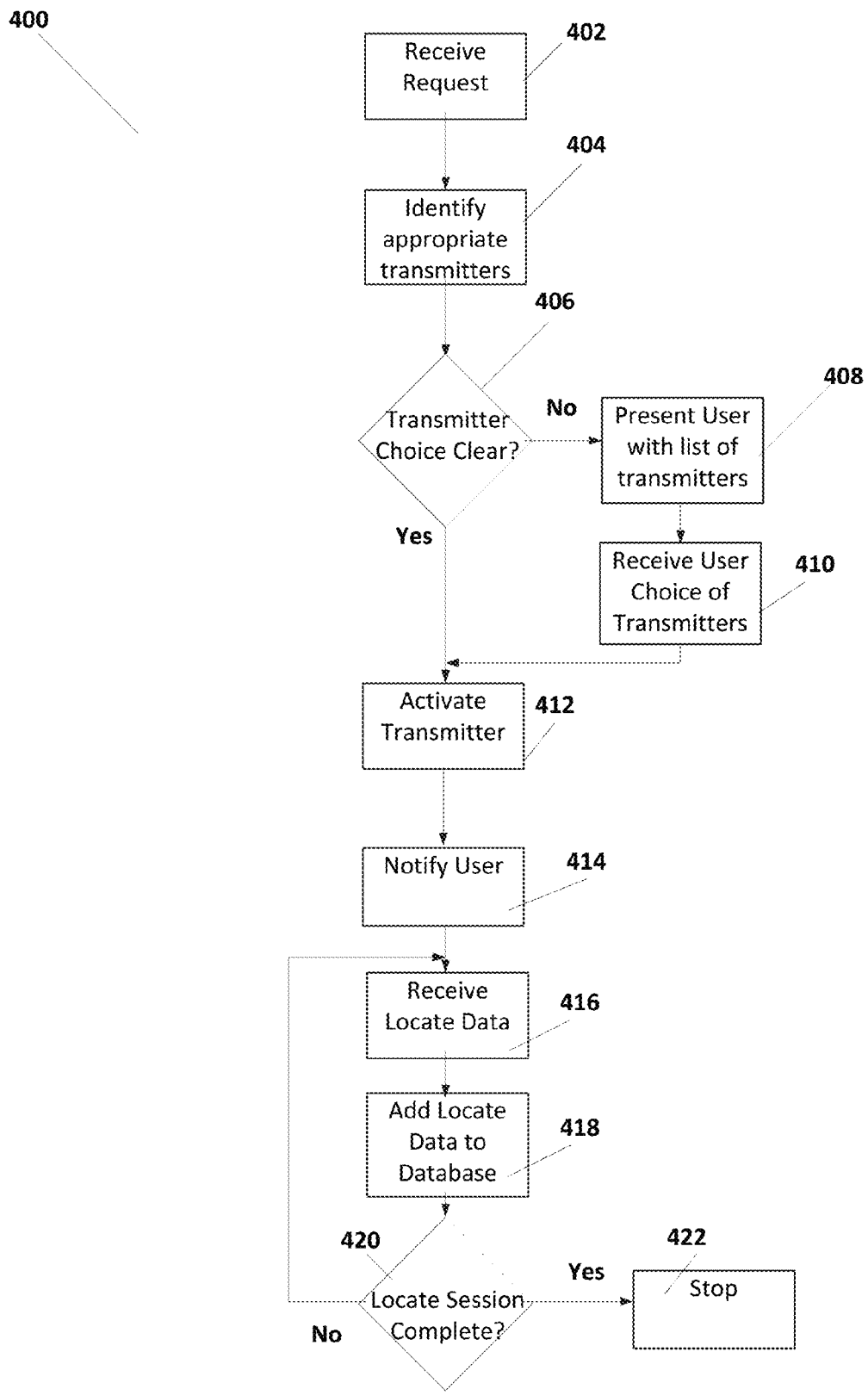
FIG. 4 illustrates operation of a server according to some embodiments.

FIG. 4 illustrates an example of the operation of server 112 in accordance with some embodiments. As shown in FIG. 4, server 112 can execute instructions to perform process 400. As shown in FIG. 4, server process 400 begins when a request is received through internet 110. In particular, the request originates with device 118 controlled by user 120. In some embodiments, the request includes a request to activate a transmitter 102 along with the geographic coordinates of the location of device 118. In some embodiments, the request may include a request to activate a particular one of transmitters 102.

In step 404, appropriate ones of transmitters 102 are identified by server 112. Server 112 communicates with database 122, which includes the geographic locations and characteristics of each of transmitters 102-1 through 102-N. In particular, server 112 may identify those transmitters 102 that are geographically close to that of device 118 and that are capable of supplying a signal onto underground line 106 in the vicinity of user 120. In some cases, there may be multiple transmitters 102 that fulfill the requirements for locating line 106. In some cases, there may be a single best one of transmitters 102 that fulfill the requirements for locating line 106.

In step 406, process 400 determines whether there are multiple available transmitters or whether there is only one. If there are multiple available transmitters 102, then in step 408 a list of transmitters, in some cases along with characteristics of each transmitter, is transmitted to device 118. In step 410, server 112 receives a choice of transmitters from the list of transmitters provided in step 408. Once the choice of transmitters 102 is received, process 400 proceeds to step 412. If, in step 406, there is only one transmitter, then process 400 proceeds directly to step 412.

In step 412, server 112 provides instructions to a chosen transmitter 102 through internet 110 in order to activate transmitter 102. After transmitter 102 has been activated, in step 414 server 112 provides a confirmation to device 118 that transmitter 102 has been activated.

In some embodiments, server 112 may also receive locate data during a locate session. Locate data may include GPS locations and depths or other relevant information at which line 106 has been located with line locator 104. In general, user 120 may locate line 106 at multiple locations along line 106 during a locate session. In step 416, server 112 receives locate data from device 118 that device 118 receives from line locator 104. As described above, device 118 can communicate with line locator 104 through any fashion. In step 418, server adds the locate data to database 122. In some embodiments, database 122 can then include locate data from multiple geographic locations in order to provide a map of underground lines.

In step 420, server 112 determines whether or not the locate session is finished. If the locate session is finished, then process 400 proceeds to step 422 and stops. If not, then process 400 returns to step 416 to receive further locate data.

In some embodiments, as discussed above, data from each locate session can be input to database 122. Based on the data from each of the locates from every user 120, maps may be formed with the location points. Furthermore, logs of the locate sessions may be made. Database 122, then, may act as a repository of all locate sessions.

In some embodiments, server 112 may be accessed to provide further data and resources to particular users. For example, a network map such as that shown in FIG. 2 illustrating the locations of the individual transmitters 120 as well as providing data from individual locate sessions may be accessed. Furthermore, individual ones of devices 118 and/or line locators 104 may be accessed through server 112 by queries over internet 110. In some cases, individual line locators and device 118 can be polled as to current location and status. In some embodiments, operating parameters of line locator 104 may be transmitted to line locator 104 over internet 110 from server 112. Further, database maintenance on database 122 can be performed through server 112. Server 112 may be accessed at the location of server 112 or through internet 110 from various remote sites.

In the preceding specification, various embodiments have been described with reference to the accompanying drawings. It will, however, be evident that various modifications and changes may be made thereto, and additional embodiments may be implemented, without departing from the broader scope of the invention as set for in the claims that follow. The specification and drawings are accordingly to be regarded in an illustrative rather than restrictive sense.

What is claimed is:

1. A device coupled to a server through a network, the device executing instructions comprising:
   receiving a request to activate a line locate transmitter from a user;
   determining a mode of operation from the request;
   in auto mode, performing steps comprising:
      determining a geographic location of the device,
      transmitting the request and the geographic location to the server,
      receiving line locate transmitter data from the server,
      determining activation of an automatically chosen line locate transmitter; and in manual mode, activating a manually chosen line locate transmitter.

2. The device of claim 1, further including:
   acquiring locate data from a line locator; and
   transmitting the locate data to the server.

3. The device of claim 1, wherein determining the geographic location of the device includes receiving geographical locating data from a geographical positioning system.

4. The device of claim 1, wherein transmitting the request and the geographic location includes transmitting the request and the geographic location through the internet.

5. The device of claim 1, wherein determining activation of the automatically chosen line locate transmitter includes
   if a list of available line locate transmitters including the automatically chosen line locate transmitter is received, choosing the automatically chosen line locate transmitter from the list and sending operating commands of the automatically chosen line locate transmitter to the server; and
   receiving a confirmation that the automatically chosen line locate transmitter has been activated.

6. A server coupled through an internet to a plurality of line locate transmitters, the server executing instructions comprising:
   receiving a request to activate a line locate transmitter of the plurality of line locate transmitters, the request including a geographic location;
   choosing, based on the geographic location, a line locate transmitter from the plurality of line locate transmitters;
   activating the chosen line locate transmitter; and
   providing confirmation that the chosen line locate transmitter is activated.

7. The server of claim 6, wherein choosing the line locate transmitter includes transmitting a list of potential line locate transmitters from the plurality of line locate transmitters and receiving requests for the chosen line locate transmitter.

8. A system, comprising:
   a line locator;
   a device in proximity to the line locator, the device configured to communicate through a network;
   a server coupled to the network; and
   a plurality of line locate transmitters distributed geographically and configured to communicate through the network,
   wherein the server operates to activate or control one of the plurality of line locate transmitters based on a geographic location of the device.

9. The system of claim 8, wherein the device is configured to communicate with the line locator and wherein the device communicates locate information to the server.

10. The system of claim 8, wherein the device is coupled to a service application, the service application providing locate services.

11. The system of claim 10, wherein the locate services includes one or more of a ticketing system, on-call system, or equipment tracking.

* * * * *